May 31, 1927. 1,630,318
K. L. TATE
APPARATUS FOR MEASURING THE FLOW OF GASES
Filed May 16, 1925
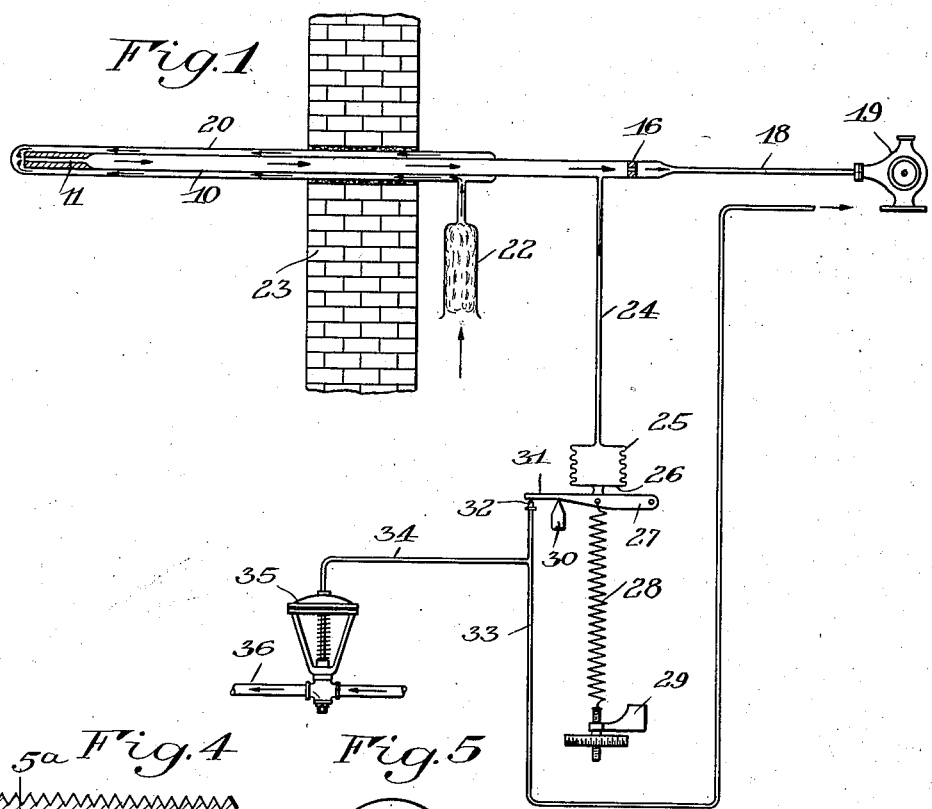
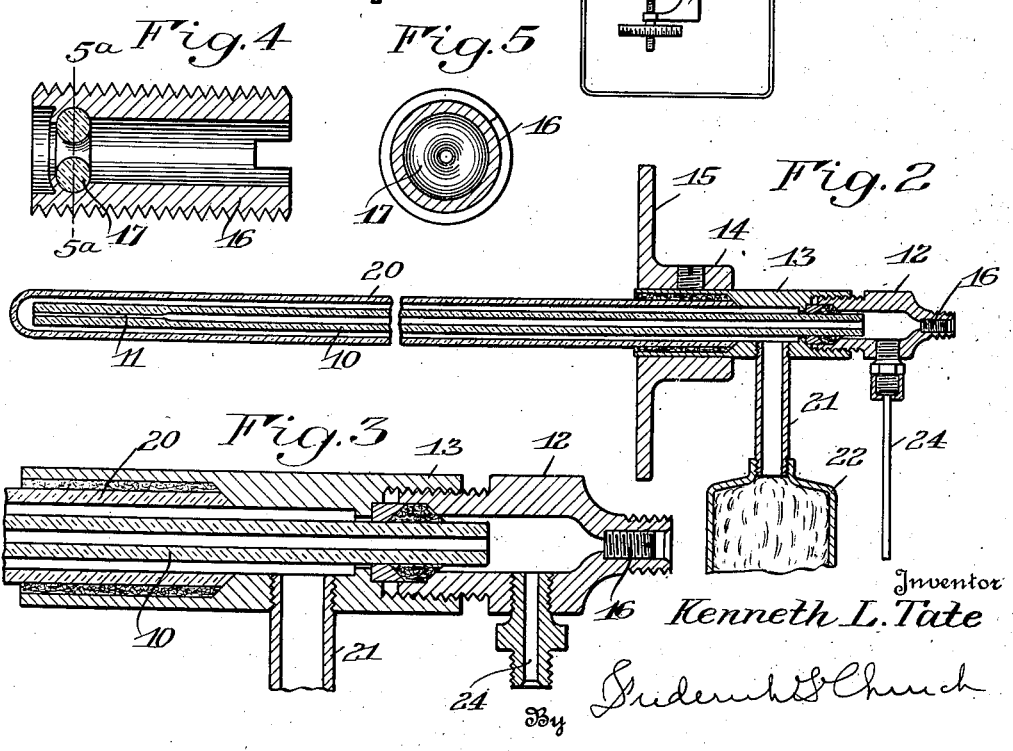

Patented May 31, 1927.

1,630,318

UNITED STATES PATENT OFFICE.

KENNETH L. TATE, OF ROCHESTER, NEW YORK, ASSIGNOR TO TAYLOR INSTRUMENT COMPANIES, OF ROCHESTER, NEW YORK, A CORPORATION OF NEW YORK.

APPARATUS FOR MEASURING THE FLOW OF GASES.

Application filed May 16, 1925. Serial No. 30,846.

This invention relates to apparatus for measuring the flow of a gas, as a function, for example, of its condition, composition, or the like, one object of the invention being to provide a simple and efficient apparatus of this character affording practical and accurate results substantially independent of close regulation of operating conditions or pressures. Another object, more specifically stated, is the provision of such an apparatus for utilizing the principle of "maximum flow" of gas through an orifice, for maintaining the application of a substantially constant pressure ratio to a restricted passage through which the flow of the gas is to be measured, for eliminating the effects of fluctuations in the operating pressures. Another object is the provision of apparatus of this nature, particularly adapted for measuring the flow of a gas as a function of its temperature for use, for example, as a pyrometer. A further object is to provide such an apparatus adapted to effect an automatic regulating action as, for instance, the control of the temperature of a furnace.

To these and other ends the invention resides in certain improvements and combinations of parts, all as will be hereinafter more fully described, the novel features being pointed out in the claims at the end of the specification.

In the drawings:—

Figure 1 is a diagrammatic view of an apparatus embodying the present invention;

Figure 2 is an enlarged sectional view of a portion of the same illustrating more particularly the chamber with restricted inlet and outlet passages through which the gas flows;

Figure 3 is a further enlarged sectional view of a portion shown in Figure 2;

Figure 4 is an enlarged sectional view of the gas outlet orifice and the means for mounting the same, and Figure 5 is a sectional view on the line 5ª—5ª in Figure 4.

Similar reference numerals throughout the several views indicate the same parts.

The invention is embodied in the present instance, by way of illustration, in an apparatus comprising an elongated tubular member or chamber 10 having restricted inlet and outlet passages through which the gas is caused to flow by a predetermined difference in the pressures to which the ends of the chamber are respectively subjected. The restricted passages may have various forms, but it is preferred for best results to employ an inlet passage in the shape of a capillary bore 11 adapted to produce transpiratory flow of the gas passing therethrough. For reasons hereafter described it is preferred to construct the tubular member 10 of a heat resistant material such, for example, as porcelain, in which case the restricted inlet 11 is formed by reducing the chamber bore at this end to a capillary size.

Tubular member 10 is mounted at its opposite end in a metal extension and holder 12 carried by a sleeve 13 mounted in the boss 14 of a plate 15 adapted to be secured to a wall or other support. Tubular extension 12 has threadedly engaged in the opposite end of its bore a sleeve 16 best shown in Figure 4. This sleeve serves as a mounting for the restricted outlet passage of chamber 10. This passage is preferably in the form of an effusion orifice as shown, for which purpose a center jewel 17 such as employed in watches has been found to serve admirably, having an opening therethrough of suitable diameter. Chamber extension 12 is connected beyond this outlet orifice with a pipe 18 leading to an exhauster or vacuum pump 19 of any suitable variety adapted to maintain a low vacuum on the adjacent or external side of the chamber outlet of, say, 2 pounds or less, absolute pressure.

The apparatus is adapted among other uses for measuring the flow of a gas as a function of its temperature, or in other words for measuring temperatures particularly in the higher ranges for which a pyrometer is generally employed and such an application will be described in the present instance by way of illustration. To this end chamber 10 is constructed of porcelain as stated, and is housed in an outer spaced tubular chamber or sleeve 20 also of porcelain closed at the end adjacent the chamber inlet 11 and mounted at its other or open end in sleeve 13, the bore of which communicates by a pipe 21 through a filter 22 with the atmosphere. It is apparent from this construction that the inlet end of chamber 10 and the closed end of its housing sleeve 20 are adapted to be inserted through the wall 23 of a furnace as shown in Figure 1, to which the mounting plate 15 is attached, so that room atmosphere comparatively free from dust is drawn by the partial vacuum applied by the pump 19 through the chamber and its extension 12 and the outlet orifice 17 to the pump. The air in its passage through sleeve 20 and through the chamber inlet 11 is subjected to the furnace temperature to be measured. The opposite end portion of the chamber 10, however, including the outlet orifice is subjected to room temperature which may be assumed as substantially constant, and the air, passing slowly through this enlarged portion of the chamber, reaches the outlet orifice at a known and substantially constant room temperature.

Means are provided for measuring the pressure in chamber 10, comprising a pipe 24 connected with the chamber as shown and at its other end with a temperature responsive device or element movable responsively to the chamber pressure for measuring the same. Preferably the pressure responsive element is in the form of a flexible walled container or diaphragm 25, adapted to have an end 26 moved by the chamber pressure. This end of the container is connected in any suitable manner with a pivoted lever 27, the motion of which is governed by a spring 28 having its opposite end adjustably connected in any suitable manner with a stationary bracket 29. A stop 30 serves to take up the downward pressure of the free end 31 of lever 27. This end of the lever plays toward and from a relief port 32 in a vacuum line 33 connected as at 34 with an automatic diaphragm valve 35 of the usual or any suitable construction, requiring regulation, for governing the flow of fluid fuel, for example, through a pipe 36 supplying the furnace the temperature of which is to be measured and controlled. These parts are so constructed and arranged that a decrease of the pressure in chamber 10 permits the sensitive element 25 to collapse under atmospheric pressure so that lever 31 is moved upwardly to uncover relief port 32 thus breaking the vacuum applied to valve 35. The latter is thereby wholly or partially closed, as well understood in the art, throttling the supply of fuel to the furnace. An increase in the chamber pressure, on the other hand, causes the sensitive element 25 to expand, so that lever 31 is moved downwardly, assisted by the tension of spring 28, to close port 32 so that the vacuum acting upon valve 35 is increased to open the valve and supply more fuel to the furnace.

It will be seen from the above construction that air, heated to the furnace temperature enters the capillary inlet 11 of the chamber 10 at atmospheric pressure and upon escaping from the capillary bore passes slowly through the enlarged portion of the chamber, eventually falling adjacent its opposite end to room temperature. The air passes at this end of the chamber through orifice 17 to a partial vacuum of say 2 pounds absolute or less maintained by pump 19. The pressure in chamber 10 between the inlet and outlet is therefore intermediate those of the atmosphere and partial vacuum and this chamber pressure depends upon the resistance to the flow of the air through the inlet bore and outlet orifice. The resistance to the flow through the inlet or capillary depends upon the dimensions of the latter and the temperature of the air, while the resistance by the outlet orifice is dependent upon its diameter, the temperature at this point being relatively constant. The effect of increased temperature on the flow through the inlet bore is to make the air flow less readily at higher temperatures with the consequence that the intermediate chamber pressure is correspondingly decreased. In other words, as the temperature to which the air is subjected increases the absolute pressure in the chamber decreases so that the latter is a temperature sensitive pressure. This is the pressure which operates the sensitive element or diaphragm 25.

In order however that the pressure in chamber 10 may be accurately sensitive solely to the temperature variations, as described, it is essential to maintain a constant effective difference between the pressures to which the chamber inlet and outlet are respectively subjected. To this end it has been found that use may be advantageously made of the known principle of "maximum flow" through the outlet orifice. In accordance with this principle, the maintenance of a pressure in the chamber more than twice that, substantially, of the partial vacuum applied externally to the outlet orifice, maintains a constant rate of flow through the latter substantially independent of fluctuations in the partial vacuum within the ratio stated. This relation, more precisely stated, is that the partial vacuum must be maintained less than .53 of the chamber pressure on the opposite side of the orifice and this result is obtained by constructing or proportioning the outlet orifice, with relation to the diameter of the inlet bore, so as to maintain the desired excess pressure in the chamber to maintain the principle of maximum flow throughout the working range for which the apparatus is designed. As a consequence, the effect of fluctuations, in the partial vacuum employed to operate the apparatus, is substantially eliminated in its influence upon the chamber pressure, leaving the latter to respond accurately to the effects of temperature upon the transpiration or flow of gas or air through the inlet capillary bore.

It is desirable also to eliminate any interference with the chamber pressure by variations in the barometric pressure and it has been found that this may be accomplished by the arrangement shown, in which the sensitive element 25 is connected directly with the chamber and at the same time subjected externally to the atmosphere or pressure applied to the chamber inlet. In other words, barometric changes penetrating into the chamber are impressed upon the sensitive element 25 internally, but the same changes are simultaneously impressed upon the element externally, so that such forces compensate for and counterbalance each other and have no material effect upon the operation of the sensitive element 25 as responsive purely to the temperature sensitive pressure in the chamber 10.

While the details and dimensions of the apparatus will obviously vary with varying applications and conditions, a successful application to the measurement and regulation of a furnace temperature for instance has been obtained with the use of a capillary bore 2 inches long and .037 inches in diameter and with an outlet orifice .021 inches in diameter. An apparatus having these dimensions is found to give a substantial variation in the chamber pressure for the working range of temperatures.

The invention thus provides a simple and efficient apparatus for measuring gas flow in which the previously necessary and troublesome factor of precise regulation of operating pressures is eliminated. That is to say the apparatus functions substantially independently of minor fluctuations in the partial vacuum which operates it, as well as independently of barometric changes. The construction and arrangement of parts is otherwise simple and reliable in character, practical from a manufacturing standpoint and convenient to install and maintain in operation. The invention is advantageously adapted for combination with automatic regulating mechanism and while described in the present instance as applied to the measuring and regulation of temperature, it is applicable in a broad sense as well to various other uses in conjunction with the measurement of the flow of gas as a function of other variables.

I claim as my invention:

1. In apparatus of the character described, the combination of a fluid conduit having a constricted tubular inlet portion, a portion on one side of the latter for exposing gas flowing through the conduit to the action of a heat zone and a constricted outlet orifice portion on the other side of the said tubular constricted portion and spaced therefrom to define an intermediate relatively expanded portion, a source of negative pressure connected to the conduit beyond the outlet portion and means responsive to variations of pressure in the said expanded portion, the inlet and the outlet orifice being so dimensioned that the external pressure upon the latter is less than about .53 of the pressure in the expanded portion of the conduit.

2. An apparatus of the character described, comprising a chamber having constricted inlet and outlet passages, means for maintaining a predetermined difference in the pressures to which said passages are externally subjected, one of said passages being constructed relative to the other to maintain a pressure difference between opposite sides thereof adapted to maintain a maximum flow therethrough substantially independent of fluctuations in the external pressure thereon, and a device responsive to variations of pressure in the said chamber.

3. An apparatus of the character described, comprising a chamber having constricted inlet and outlet passages, means for maintaining a predetermined difference in the pressures to which said passages are externally subjected, said outlet passage being constructed relative to said inlet passage to maintain a pressure difference between opposite sides of said outlet passage adapted to maintain a maximum flow therethrough substantially independent of fluctuations in the external pressure thereon, and a device responsive to variations of pressure in the said chamber.

4. An apparatus of the character described, comprising a chamber having constricted inlet and outlet passages, means for maintaining a predetermined difference in the pressures to which said passages are externally subjected, said outlet passage being constructed relative to said inlet passage to maintain a pressure in the chamber more than twice that, substantially, to which said outlet passage is externally subjected, to maintain a maximum flow through the latter and render the chamber pressure substantially independent of fluctuations in the external pressure on said outlet passage, and a device responsive to variations of pressure in the said chamber.

5. An apparatus of the character described comprising a chamber having a capillary inlet for producing transpiration and a constricted outlet, means for subjecting said outlet externally to a partial vacuum, said outlet being so proportioned relative to said inlet as to maintain a pressure difference between opposite sides of said outlet adapted to maintain a maximum flow therethrough substantially independent of fluctuations in said partial vacuum, and a pressure responsive device connected with and movable responsively to the chamber pressure.

6. An apparatus of the character described comprising a chamber having a capillary inlet for producing transpiratory flow and an effusion orifice outlet, means for maintaining a difference between the pressures to which said inlet and outlet are externally subjected, respectively, to maintain a flow of gas therethrough, said outlet being so proportioned as to maintain the pressure in said chamber more than twice that, substantially, to which said outlet is externally subjected, to maintain a maximum flow through said outlet and render the pressure in said chamber substantially independent of fluctuations in said outlet pressure, and a pressure responsive device connected with said chamber, subjected also to said external inlet pressure to compensate for variations produced by the latter in said chamber pressure.

KENNETH L. TATE.